US010489077B2

United States Patent

(12) United States Patent
Sankule et al.
(10) Patent No.: US 10,489,077 B2
(45) Date of Patent: Nov. 26, 2019

(54) SYSTEMS AND METHODS FOR CONTROLLING METAPAGE STORAGE ON DATA STORAGE DEVICES

(71) Applicant: Western Digital Technologies, Inc., San Jose, CA (US)

(72) Inventors: Sourabh Sankule, Bangalore (IN); Avinash Sharma, Bangalore (IN); Mikhail Palityka, Oakville (CA)

(73) Assignee: WESTERN DIGITAL TECHNOLOGIES, INC., San Jose, CA (US)

( * ) Notice: Subject to any disclaimer, the term of this patent is extended or adjusted under 35 U.S.C. 154(b) by 233 days.

(21) Appl. No.: 15/607,521

(22) Filed: May 28, 2017

(65) Prior Publication Data

US 2018/0341406 A1 Nov. 29, 2018

(51) Int. Cl.

| | |
|---|---|
| ***G06F 3/06*** | (2006.01) |
| ***G06F 12/02*** | (2006.01) |
| ***G06F 13/16*** | (2006.01) |

(52) U.S. Cl.

CPC .............. *G06F 3/064* (2013.01); *G06F 3/061* (2013.01); *G06F 3/0679* (2013.01); *G06F 12/0246* (2013.01); *G06F 13/1694* (2013.01); *G06F 2212/1041* (2013.01); *G06F 2212/7201* (2013.01); *G06F 2212/7206* (2013.01); *G06F 2212/7208* (2013.01)

(58) Field of Classification Search

None

See application file for complete search history.

(56) References Cited

U.S. PATENT DOCUMENTS

2015/0301755 A1* 10/2015 Chodem .............. G06F 11/141 714/764
2016/0092302 A1* 3/2016 Agarwal ............ G06F 11/1068 714/773
2016/0092325 A1* 3/2016 Bar ..................... G06F 11/0766 714/6.1
2016/0188404 A1* 6/2016 Das ..................... G06F 11/1048 714/773
2017/0031612 A1* 2/2017 Ravimohan ........... G06F 3/0619

* cited by examiner

*Primary Examiner* — Kevin Verbrugge

(74) *Attorney, Agent, or Firm* — Loza & Loza, LLP; Gabriel Fitch

(57) ABSTRACT

Systems and methods are disclosed for executing access commands for a data storage device. A data storage device receives first data to be written to a plurality of dies/non-volatile memory arrays. The data storage device transfers a first metapage of the first data to the plurality of dies/non-volatile memory arrays. The data storage device also programs the first metapage to a first metablock of the plurality of dies and programs the first metapage to a second metablock of the plurality of dies/non-volatile memory arrays. The data storage device further transfers a second metapage to the plurality of dies/non-volatile memory arrays. Programming the first metapage to the first metablock may be simultaneous with transferring the second metapage to the plurality of dies/non-volatile memory arrays.

28 Claims, 7 Drawing Sheets

SYSTEMS AND METHODS FOR CONTROLLING METAPAGE STORAGE ON DATA STORAGE DEVICES

BACKGROUND

Field

This disclosure relates to computing devices and systems. More particularly, the disclosure relates to systems and methods for executing access commands (e.g., write commands) in a data storage device and/or other computing devices/systems.

Description of Related Art

In data storage devices and systems, data may be received from a host (e.g., a computing device such as a desktop computer, a laptop computer, a smartphone, a tablet computer, etc.) and may be written to a memory of the data storage device/system. Errors may occur when writing the data to the memory of the data storage device/system.

BRIEF DESCRIPTION OF THE DRAWINGS

Various embodiments are depicted in the accompanying drawings for illustrative purposes, and should in no way be interpreted as limiting the scope of this disclosure. In addition, various features of different disclosed embodiments can be combined to form additional embodiments, which are part of this disclosure.

DETAILED DESCRIPTION

Figure 1:
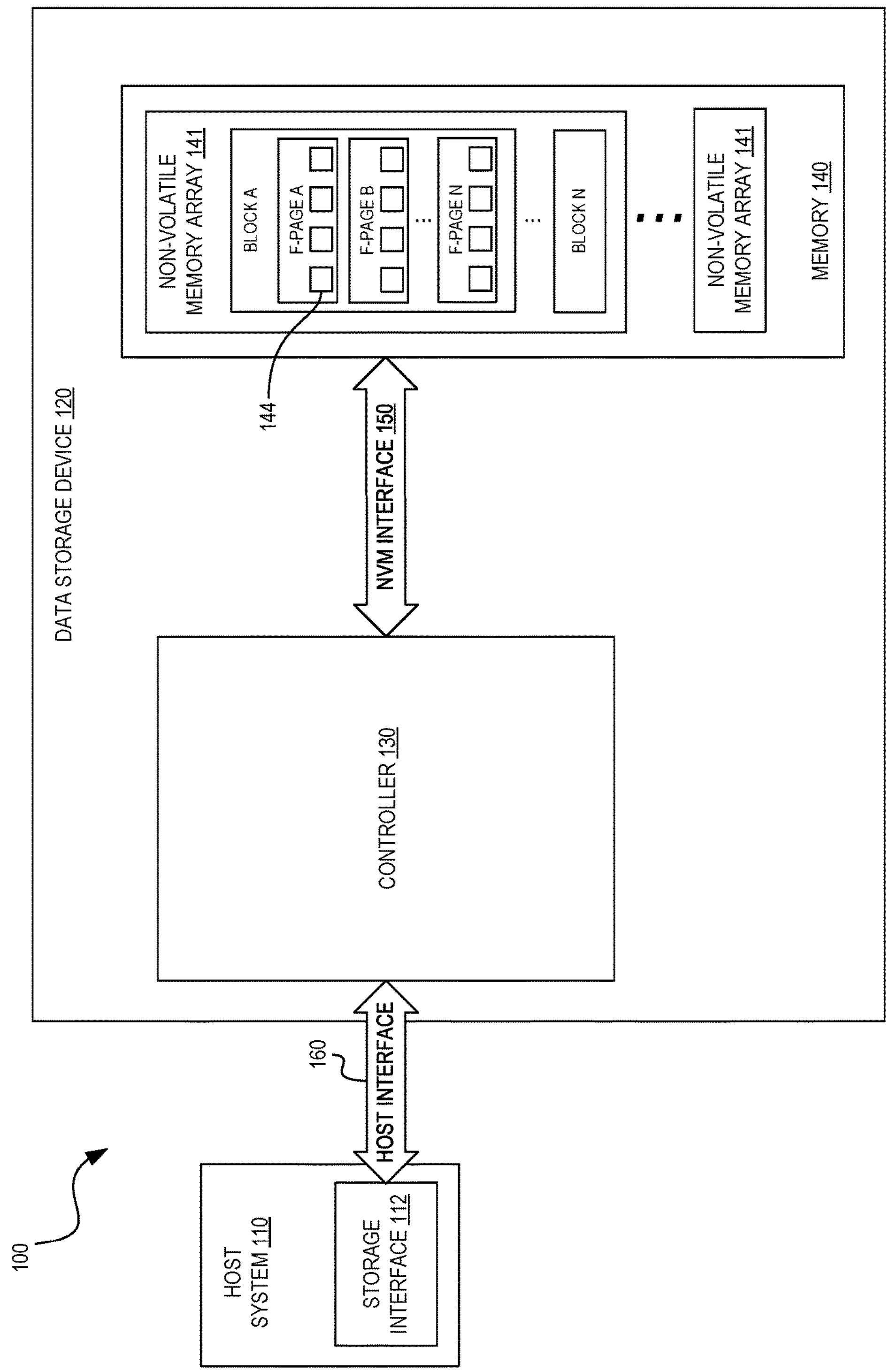
FIG. 1 is a diagram illustrating a data storage system, according to one or more embodiments of the present disclosure.

While certain embodiments are described, these embodiments are presented by way of example only, and are not intended to limit the scope of protection. Indeed, the novel methods and systems described herein may be embodied in a variety of other forms. Furthermore, various omissions, substitutions and changes in the form of the methods and systems described herein may be made without departing from the scope of protection.

The headings provided herein are for convenience only and do not necessarily affect the scope or meaning of the claims. Disclosed herein are example configurations and embodiments related to executing access commands for a data storage device (e.g., writing data to a data storage device).

Overview

A host (e.g., a computing device such as a desktop computer, a laptop computer, a smartphone, a tablet computer, etc.) may send access commands to a data storage device/system to read and/or write data to the data storage device/system. Issues such as data loss, wordline to wordline (WL-WL) shorts, program/write failures, defects in memory elements, etc., may cause errors when data is written to the data storage device. Some data storage devices/systems use a dual write scheme in order to address these issues. In one embodiment, data storage devices/systems that use a dual write scheme may write data to two separate sets of blocks. This may allow the data storage device/system to have a second/backup copy of the data in case there is an error writing the data to one of the sets of blocks.

Although a dual write scheme may allow the data storage device/system to write data to a memory more reliably, the dual write scheme may affect the throughput and/or performance of the data storage device/system. For example, many data storage devices/systems will wait until data (e.g., a metablock) is completely transferred to a die/non-volatile memory array before programming (e.g., writing) the second copy of the data. This may cause a delay when writing data to the data storage device which may decrease the performance and/or throughput (e.g., write throughout, the amount of data that can be written/programmed in a period of time, etc.) of the data storage device.

Certain embodiments disclosed herein provide for improved efficiency, performance, and/or throughput in data storage systems/devices by programming a second copy of a page in a metapage as soon as the next page in the metapage is transferred. Programming the second copy of the page (in a metapage) as soon as the next page (in the metapage) is transferred instead of waiting for the entire metapage to be transferred may improve the efficiency and/or performance of the data storage device by allowing the data storage device to perform more operations (e.g., programming a first copy of a first page, programming a second copy of a second page, transferring a third page) simultaneously. Other embodiments disclosed herein provide for improved efficiency, performance, and/or throughput in data storage systems/devices by transferring a second metapage to the set of non-volatile memory arrays 141 without waiting for a first metapage to be programmed to a first metablock and a second metablock. Transferring the second metapage to the set of non-volatile memory arrays without waiting for first metapage to be programmed to the first metablock and the second metablock may improve the efficiency and/or performance of the data storage device by allowing the data storage device to transfer the second metapage more quickly.

Although certain embodiments are disclosed herein in the context of solid-state data storage devices and systems, it should be understood that certain features disclosed herein may be applicable devices/systems incorporating one or more other types of data storage, such as magnetic media, or other volatile or non-volatile memory. As used in this application, "non-volatile solid-state memory," "non-volatile memory," "NVM," or variations thereof may refer to solid-state memory such as NAND flash. However, the systems and methods of this disclosure may also be useful in more conventional hard drives and hybrid drives including both solid-state and hard drive components. Solid-state memory may comprise a wide variety of technologies, such as flash integrated circuits, Phase Change Memory (PC-RAM or PRAM), Programmable Metallization Cell RAM (PMC-RAM or PMCm), Ovonic Unified Memory (OUM), Resistance RAM (RRAM), NAND memory (e.g., single-level cell (SLC) memory, multi-level cell (MLC) memory, triple-level cell (TLC) memory, etc.), NOR memory, EEPROM, Ferroelectric Memory (FeRAM), MRAM, or other discrete NVM (non-volatile solid-state memory) chips. The non-volatile solid-state memory arrays or storage devices may be physically divided into planes, blocks, pages, and sectors, as is known in the art. Other forms of storage (e.g., battery backed-up volatile DRAM or SRAM devices, magnetic disk drives, etc.) may additionally or alternatively be used.

Data Storage System

FIG. 1 is a block diagram illustrating a data storage system 100, according to one or more embodiments of the present disclosure. The data storage system 100 includes a host system 110 and a data storage device 120. The data storage device 120 may execute access commands (e.g., program/write data to the memory 140 of the data storage device 120) in accordance with embodiments, examples, and/or implementations disclosed herein. The data storage device 120 may be any type of data storage device, module, component, system, or the like. Furthermore, the terms "drive" and "data storage drive" may be used herein in certain contexts refer to any type storage device, and may be used substantially interchangeably with the term "data storage device" in some contexts. For example, the terms "drive," "solid-state drive," and the like, may be used to refer to a data storage device, which may be embodied in a board having one or more solid-state memory chips mounted thereon or associated therewith, wherein the board may be disposed within a housing, or the like. With respect to the data storage system 100 of FIG. 1, the terms "data storage drive" and/or "solid-state drive" may refer to the data storage device 120 and/or the memory 140.

Figure 2:
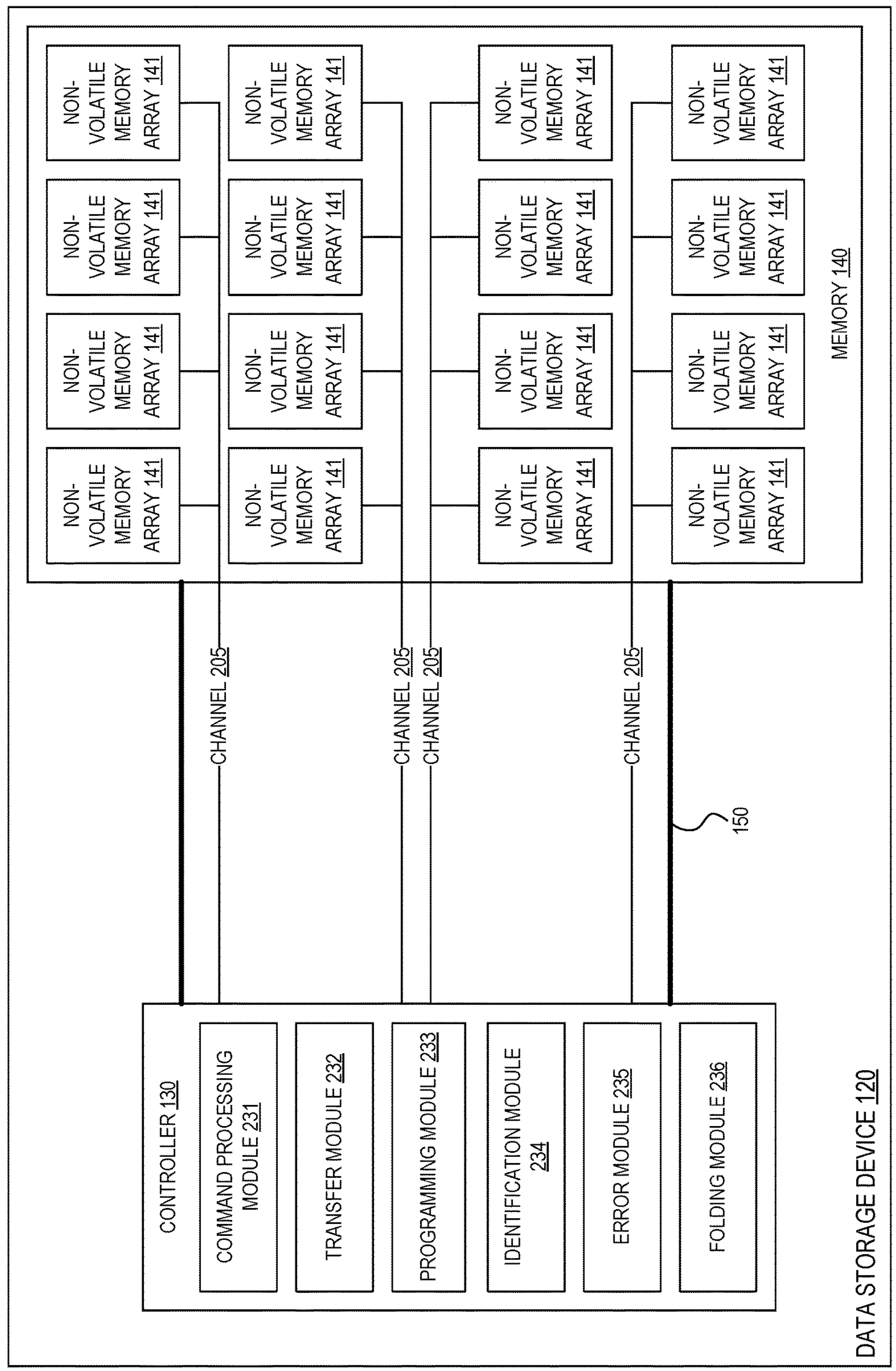
FIG. 2 is a diagram illustrating a data storage device, according to one or more embodiments of the present disclosure.

As shown, the data storage device 120 (e.g., hybrid hard drive, solid-state drive, any storage device utilizing solid-state memory, etc.) includes a controller 130 (e.g., control circuitry) and a memory 140. The controller 130 may receive data commands (from the host system 110) and may execute such commands in the memory 140 (e.g., in one or more of the non-volatile memory arrays 141). The controller 130 may comprise one or more processors, memory devices, data and/or power transmission channels/paths, boards, or the like. In certain embodiments, the controller 130 may be implemented as one or more system-on-a-chip (SoC) modules, field-programmable gate array (FPGA) modules, application-specific integrated circuit (ASIC) modules, processing devices (e.g., processors), chips, or the like. In certain embodiments, one or more components of the controller 130 may be mounted on a printed circuit board (PCB). The controller 130 may be configured to receive data commands from a storage interface 112 (e.g., a device driver) residing on the host system 110. The controller 130 may communicate with the host system 110 over a host interface 160, and may receive data storage access commands using the host interface 160. Data storage access commands may specify a block address in the data storage device 120; data may be accessed/transferred based on such commands. The controller 130 may include multiple modules, as discussed in more detail below (e.g., as illustrated in FIG. 2). In one embodiment, the controller 130 may include multiple cores (e.g., execution cores, processing cores, etc.). For example, the controller 130 may be a multi-core processor. Each core may execute access commands for a respective channel and/or set of non-volatile memory arrays 141.

The data storage device 120 can store data received from the host system 110 such that the data storage device 120 acts as data storage for the host system 110. To facilitate this function, the controller 130 can implement a logical interface. The logical interface can present to the host system memory as a set of logical addresses (e.g., sequential/contiguous addresses) where data can be stored. Internally, the controller 130 can map logical addresses to various physical memory addresses in the non-volatile memory arrays 141 and/or other memory module(s). Mapping data indicating the mapping of logical addresses to physical memory addresses may be maintained in the data storage device. For example, mapping table data may be stored in non-volatile memory array 141 in order to allow for recreation of mapping tables following a power cycle.

In some embodiments, each non-volatile memory array 141 may include one or more blocks of storage, identified as Block A through Block N. Each block may include a plurality of flash pages (F-pages). For example, Block A of FIG. 1 includes a plurality of F-pages, identified as F-pages A through N. In some embodiments, each F-page is a smallest grouping of memory cells in the non-volatile memory array 141 that can be programmed in a single operation or as a unit. Further, each F-page may include a plurality of code words, such as error-correcting pages (E-pages). In the illustrated embodiment, each F-page includes four E-pages that are illustrated as four boxes, including E-page 144. Other embodiments may use F-pages or E-pages that are defined differently or each F-page may include greater or fewer than four E-pages. In some embodiments, each non-volatile memory array 141 may be a die. For example, each non-volatile memory array 141 may be a flash memory die, a semiconductor die, a NAND die, etc. One having ordinary skill in the art understands that the blocks and/or pages illustrated in FIG. 1 may be different sizes in different embodiments. For example, the sizes of the blocks and/or pages may be 4 kilobytes (KB), 8 KB, 16 KB, 32 KB, 64 KB, etc.

In one embodiment, the interface 150 may include a plurality of channels (e.g., one or more lines, pines, wires, traces, etc.) and each channel may be coupled to a set of non-volatile memory arrays 141 (e.g., multiple dies), as discussed in more detail below. In one embodiment, the interface 150 may be a NVM interface. The number of non-volatile memory arrays 141 on a channel (e.g., the number of dies that share a channel) may vary between different data storage devices. For example, a first manufacturer of data storage devices may have four non-volatile memory arrays on a channel and a second manufacturer of data storage devices may have eight non-volatile memory arrays on a channel. The number of channels and/or the number of non-volatile memory arrays that share a channel (e.g., that are on a same channel) may be referred to as a layout, a flash layout, a NAND layout, a geometry, a flash geometry, a NAND geometry, etc. One having ordinary skill in the art will understand that different layouts may be used in different embodiments.

As discussed above, the controller 130 may receive access commands from the host system 110 via the host interface 160. Access commands may include read commands and write commands. For example, the commands may include a read command (e.g. a data read command) to read data from a page in a non-volatile memory array 141. The controller 130 may read the data from the page and may transmit the data to the host system 110 via the host interface 160. In another example, the commands may include a write command (e.g., a data write command) to write data to a page in a non-volatile memory array 141. In one embodiment, write commands may include program commands (e.g., a command to write the value "1" to a location a non-volatile memory array 141) and erase commands (e.g., a command to write the value "0" to a location in a non-volatile memory array 141). The controller 130 may receive the data from the host system 110 via the host interface 160 and may write the data to the page.

The controller 130 may write multiple pages or set of pages at a time, to the non-volatile memory arrays 141. The multiple pages or sets of pages may be referred to as metapages. The metapages may be programmed (e.g., written) to metablocks (e.g., multiple blocks, set of blocks) in the non-volatile memory arrays 141. As discussed above, the controller 130 may use a dual write scheme when programming/writing metapages to the non-volatile memory arrays 141. The controller 130 may write a metapage to a metablock by first transferring a page of the metapage to a non-volatile memory array, as discussed in more detail below. The controller may program the page of the metapage to a first block in a first metablock and may program the page to a first block in a second metablock, as discussed in more detail below.

Certain data storage devices/systems that use a dual write scheme may have decreased performance and/or data throughput (e.g., write throughput). Although a dual write scheme may allow the data storage device/system to write data to a memory more reliably, the dual write scheme may affect the throughput and/or performance of the data storage device/system because data storage devices/systems may wait until a metablock is completely transferred to a die/non-volatile memory array before programming (e.g., writing) the second copy of the data. Waiting until a metablock is completely transferred may cause a delay when writing data to the data storage device which may decrease the performance and/or throughput of the data storage device/system.

In some embodiments, programming a second copy of a page in a metapage as soon as the next page in the metapage is transferred may improve the efficiency and/or performance of the data storage device by allowing the data storage device to perform more operations (e.g., programming a first copy of a first page, programming a second copy of a second page, transferring a third page) simultaneously. In other embodiments, transferring a second metapage to the set of non-volatile memory arrays 141 without waiting for a first metapage to be programmed to a first metablock and a second metablock may improve the efficiency and/or performance of the data storage device by allowing the data storage device to transfer the second metapage more quickly.

Data Storage Device

FIG. 2 is a diagram illustrating a data storage device 120, according to one or more embodiments of the present disclosure. The data storage device includes a controller 130, an interface 150 and a memory 140, as discussed above. The controller 130 includes a command processing module 231, a transfer module 232, a programming module 233, an identification module 234, an error module 235, and a folding module 236. The memory 140 includes a plurality of non-volatile memory arrays 141. As discussed above, each of the non-volatile memory arrays 141 may be a die (e.g., a flash memory die, a NAND die, etc.). Also as discussed above, the non-volatile memory arrays 141 (e.g., dies) may be divided into planes, blocks, pages, etc.

As illustrated in FIG. 2, the controller 130 is coupled to the memory 140 via the interface 150. The interface 150 includes a plurality of channels 205. Each of the plurality of channels is coupled to a set of non-volatile memory arrays 141 (e.g., to a set of dies). Thus, the set of non-volatile memory arrays 141 may share a channel 205. For example, the top most four non-volatile memory arrays 141 share the top most channel 205. Each of the plurality of channels may include one or more data lines, pins, traces, wires, etc., that may be used to communicate information between the controller 130 and the memory 140.

As discussed above, the layout of the memory 140 may differ between different types/models of data storage devices (e.g., there may be a different number of channels and a different number of non-volatile memory arrays 141 per channel). For example, eight non-volatile memory arrays may share a channel and there may be eight channels. In another example, two non-volatile memory arrays may share a channel and there may be twenty-four channels.

In one embodiment, the command processing module 231 may receive access commands from a host system. For example, referring to FIG. 1, the command processing module 231 may receive one or more write commands from host system 110 via the host interface 160. The one or more write commands may include data to be programmed (e.g., written) to the non-volatile memory arrays 141 (e.g., NAND dies, flash dies, etc.) in the memory 140. The data included in the one or more write commands may include metapages (e.g., multiple pages, set of pages) of data to be written to the non-volatile memory arrays 141. In one embodiment, an access command may include multiple metapages of data to be written to the non-volatile memory arrays 141. For example, an access command may include a first metapage and a second metapage. In another embodiment, the multiple metapages may be included in different access commands. For example, a first access command may include a first metapage and a second access command may include a second metapage.

In one embodiment, the transfer module 232 may transfer one or more pages to the non-volatile memory arrays 141 so that the one or more pages may be written (e.g., programmed) onto one or more blocks (e.g., metablocks) of the non-volatile memory arrays 141. For example, the transfer module 232 may transfer a metapage (e.g., one or more pages received from the host via one or access commands or write command) to a random-access-memory (RAM) that is coupled to the non-volatile memory arrays 141. In another embodiment, the transfer module 232 may transfer the metapage to the non-volatile memory arrays 141 that share a channel 205. For example, the transfer module 232 may transfer the metapage to the top four non-volatile memory arrays 141 (e.g., the top row of non-volatile memory arrays 141) which share the top channel 205.

In one embodiment, the identification module 234 may identify one or more blocks (e.g., one or more metablocks) in the non-volatile memory arrays 141 where metapages (e.g., one or more pages) received from the host may be programmed. For example, the identification module 234 may identify a first metablock (e.g., a first set of blocks) to program a first copy (e.g., a primary copy) of the metapage (e.g., a first set of pages), as discussed in more detail below. The identification module 234 may also identify a second metablock (e.g., a second set of blocks) to program a second copy (e.g., a secondary copy, a backup copy, etc.) of the metapage, as discussed in more detail below. Each metablock (e.g., each of the first set of blocks and the second set of blocks) may span multiple non-volatile memory arrays 141 that share a channel, as discussed in more detail below. For example, a metablock may include at least one block from each of non-volatile memory arrays 141 (e.g., dies) that share a channel 205.

In one embodiment, the identification module 234 may determine the layout of the memory 140 and/or the non-volatile memory arrays 141. For example, the identification module 234 may determine the number of channels 205 in the interface 150 (e.g., may determine that there are four channels 205). In another example, the identification module 234 may determine the number of non-volatile memory arrays 141 (e.g., dies) that are on each channel (e.g., may determine that each channel 205 has four non-volatile memory arrays 141 that share the channel 205). The controller 130 and/or identification module 234 may determine the layout of the non-volatile memory arrays 141 when the data storage device 120 is booted or when the controller 130 and/or identification module 234 connects to the memory 140 via interface 150. The controller 130 and/or identification module 234 may determine the layout of the non-volatile memory arrays 141 by transmitting a message, a request, etc., to the memory 140 or by accessing data (e.g., a field, a parameter, a setting, etc., that may indicate the layout) stored in the data storage device 120. In one embodiment, the identification module 234 may automatically determine the layout of the memory 140. For example, the identification module 234 may automatically determine the layout of the memory 140 when the data storage device 120 begins/initiates operation (e.g., when the data storage device 120 boots).

In one embodiment, the programming module 233 may program the metapage to the first metablock (identified by the identification module 234). The programming module 233 may also program the metapage to the second metablock (identified by the identification module 234). For example, the programming module 233 may write a first copy of metapage (e.g., a primary copy) to the blocks in the first metablock. The programming module 233 may also write a second copy of the metapage (e.g., a secondary copy, a backup copy, etc.) to the blocks in the second metablock.

In one embodiment, transfer module 232 may transfer a second metapage (e.g., a second set of pages) to the non-volatile memory arrays 141. For example, the transfer module 232 may transfer a second metapage to the top four non-volatile memory arrays 141 (e.g., the top row of non-volatile memory arrays 141) which share the top channel 205. The transfer of the second metapage may occur simultaneous with the programming of the first copy of the first metapage to the first metablock, as discussed in more detail below. For example, at least a portion of the transfer of the second metapage may occur at the same time as a portion of the programming of the first copy of the first metapage to the first metablock. The transfer of the second metapage may also occur simultaneous with the programming of the second copy of the first metapage to the second metablock. For example, at least a portion of the transfer of the second metapage may occur at the same time as a portion of the programming of the first copy of the first metapage to the first metablock and may also occur at the same time as a portion of the programming of the second copy of the first metapage to the second metablock.

In one embodiment, the error module 235 may determine whether the programming module 233 has finished programming the first metapage to the first metablock and to the second metablock. For example, the error module 235 may determine whether the first copy of the first metapage has been written (e.g., programmed) to the first metablock and whether the second copy of the first metapage has been written (e.g., programmed) to the second metablock. The error module 235 may also determine whether an error occurred when programming the first metapage (e.g., a first copy of the first metapage) to the first metablock. If no error occurred when programming the first metapage to the first metablock, the error module may erase the first metapage (e.g., the second copy of the second metapage) from the second metablock. If an error occurred when programming the first metapage to the first metablock, the error module may erase the first metapage (e.g., the first copy of the second metapage) from the first metablock.

As discussed above, the data storage device 120 may include multiple types of memory (e.g., some of the non-volatile memory arrays 141 may include SLC memory and some of the non-volatile memory arrays 141 may include MLC/TLC memory). SLC memory may have better performance when compared to MLC/TLC memory. For example, it may be faster to read from and/or write to SLC memory. However, SLC memory may store less data because SLC memory may be in one of two states (e.g., 0 or 1). MLC memory may store more data than SLC memory because MLC memory may be in one of four states (e.g., 00, 01, 10, and 11). However, MLC memory may be slower than SLC memory. TLC memory may store more data than MLC memory and SLC memory because TLC memory may be in one of eight states (e.g., 000, 001, 010, 011, 100, 101, 110, and 111). However, TLC memory may be slower than SLC memory and/or MLC memory.

In one embodiment, the folding module 236 may copy and/or move data (e.g., bits, bytes, blocks, metablocks, pages, metapages, etc.) of data from the non-volatile memory arrays 141 that include SLC memory to the non-volatile memory arrays 141 that include MLC memory or TLC memory. For example, each MLC memory element may be in one of four states (which allows the MLC memory element to store two bits of data) and each SLC memory element may be in one of two states (which allows the SLC memory element to store on bit of data), as discussed above. The folding module 236 may copy and/or move the data from two SLC memory elements to one MLC memory element. In another example, each TLC memory element may be in one of eight states (which allows the TLC memory element to store three bits of data) and each SLC memory element may be in one of two states (which allows the SLC memory element to store one bit of data), as discussed above. The folding module 236 may copy and/or move the data from three SLC memory elements to one TLC memory element. Copying data from SLC memory (e.g., SLC memory elements) to MLC memory (e.g., MLC memory elements) or TLC memory (e.g., TLC memory elements) may be referred to as folding, a folding operation, compaction, etc. Folding operations may allow data stored in SLC memory to be moved/copied to MLC/TLC memory, thus freeing up the SLC memory. This may allow the data storage device to execute access commands using the SLC memory (which may be faster than executing access commands using MLC/TLC memory) which may increase the performance/throughout of the data storage device.

In one embodiment, the folding operation (e.g., copying and/or moving of data from SLC memory to MLC/TLC memory) may occur simultaneous with the programming of metapages to the metablocks of the non-volatile memory arrays 141, as discussed in more detail below. In one embodiment, the folding operation may be a balanced folding operation. A balanced folding operation may be a folding operation where the amount of data that is copied/moved to MLC/TLC memory is the same as the amount of new data that is programmed/written to SLC memory. One having ordinary skill in the art understands that other types of folding schemes may be used in the folding operations.

The operation of the controller 130 (e.g., the command processing module 231, the transfer module 232, the programming module 233, the identification module 234, the error module 235, and the folding module 236) may advantageously increase the efficiency, performance, and/or throughput of the data storage device 120. In one embodiment, a controller may program a second copy of a page in a metapage as soon as the next page in the metapage is transferred. Programming the second copy of the page (in a metapage) as soon as the next page (in the metapage) is transferred instead of waiting for an entire metapage to be transferred before programming the second copy of the page may improve the efficiency and/or performance of the data storage device by allowing the data storage device to perform more operations (e.g., programming a first copy of a first page, programming a second copy of a second page, transferring a third page) simultaneously. This may also allow the data storage device to hide the programming of pages behind transfers of pages to the non-volatile memory arrays.

In another embodiment, the controller 130 may transfer the second metapage to the set of non-volatile memory arrays 141 without waiting for the first metapage to be programmed to a first metablock and a second metablock. Transferring the second metapage to the set of non-volatile memory arrays without waiting for first metapage to be programmed to the first metablock and the second metablock may improve the efficiency and/or performance of the data storage device by allowing the data storage device to transfer the second metapage more quickly which may increase/improve the performance and/or throughput of the data storage device.

The command processing module 231, the transfer module 232, the programming module 233, the identification module 234, the error module 235, and the folding module 236 may each provide means for implementing certain respective functionalities as described herein, where such means may include control circuitry (e.g., special purpose control circuitry) including one or more processors (e.g., special purpose processor(s)), memory devices, transmission paths, and other hardware, firmware, and/or software components, or combinations thereof, configured to implement the functionalities of the respective modules described herein.

Figure 3:
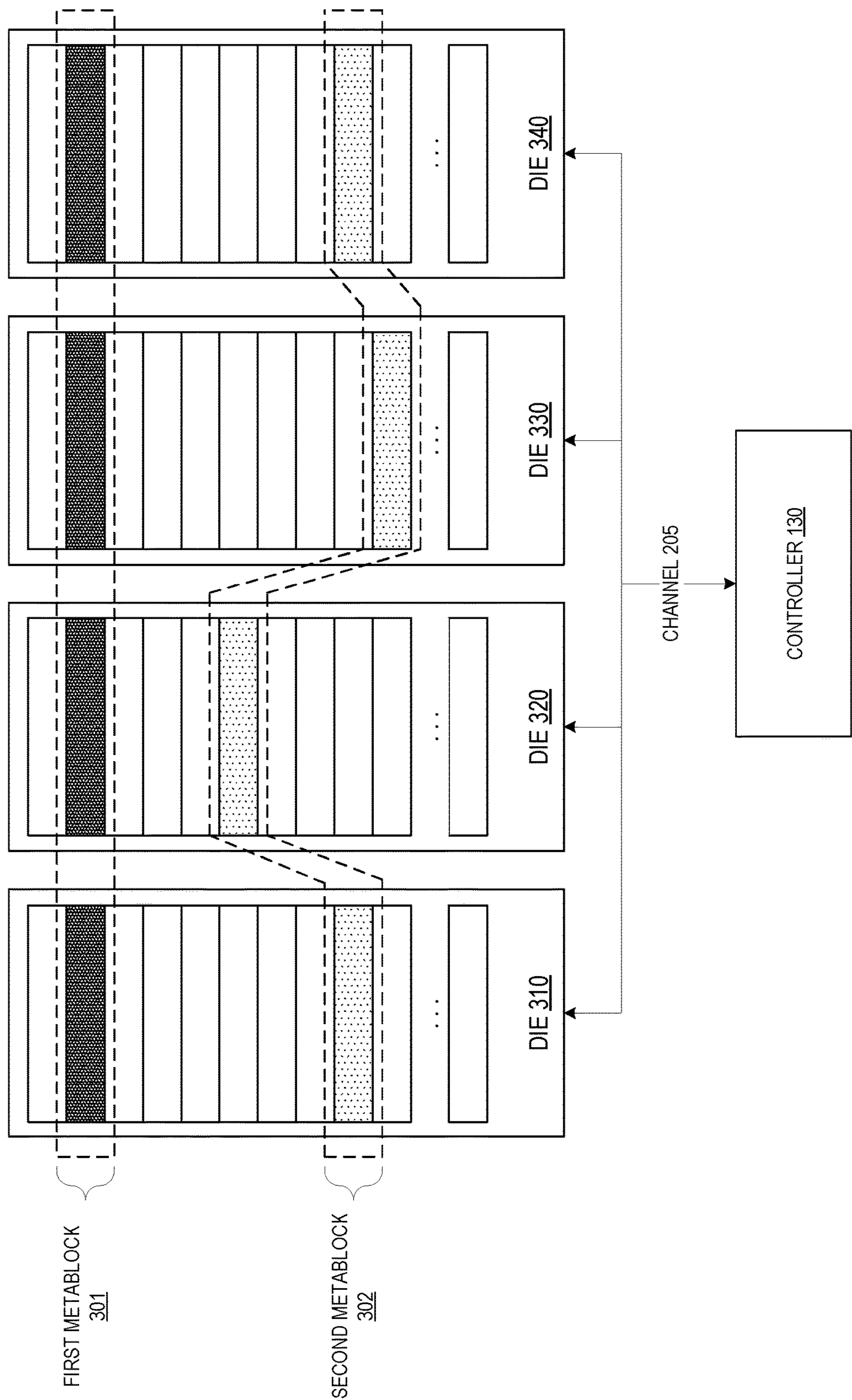
FIG. 3 is a diagram illustrating metablocks, according to one or more embodiments of the present disclosure.

FIG. 3 is a diagram illustrating metablocks 301 and 302, according to one or more embodiments of the present disclosure. As discussed above, the controller 130 may receive access commands that include data to be programmed (e.g., written) to a memory (e.g., memory 140 illustrated in FIGS. 1 and 2) of a data storage device (e.g., data storage device 120 illustrated in FIGS. 1 and 2). The controller 130 may be coupled to the memory via a communication interface (e.g., interface 150 illustrated in FIGS. 1 and 2), as discussed above. The memory may include a plurality of dies 310, 320, 330, and 340 (e.g., non-volatile memory arrays) and the communication interface may include a plurality of channels, as discussed above. Each channel may be coupled to a set of dies (e.g., multiple dies or non-volatile memory arrays may share a channel), as discussed above. For example, the dies 310, 320, 330, and 340 are coupled to the controller 130 via channel 205 (e.g., dies 310, 320, 330, and 340 share the channel 205), as illustrated in FIG. 3.

Each of the dies 310, 320, 330, and 340 include a plurality of blocks represented by rectangles in a respective die. One having ordinary skill in the art understands that the size of each of the blocks may vary in different embodiments (e.g., the size of each block may be 8 KB, 16 KB, 32 KB, 64 KB, etc.). The size of the block may be the same as the size of the pages in the metapage. For example, each block in the dies 310, 320, 330, and 340 may be 32 KB and each page in the metapage of data (to be programmed to the dies 310, 320, 330, and 340) may also be 32 KB.

As discussed above, the controller 130 may program (e.g., write) a metapage (received via one or more access commands such as write commands) to the dies 310, 320, 330, and 340. Also as discussed above, the controller 130 may write the metapage to two metablocks (e.g., two separate sets of blocks) to address issues/errors that may occur when programming (e.g., writing data) to the dies 310, 320, 330, and 340. As illustrated in FIG. 3, the controller 130 may write the metapage to a first metablock 301 and a second metablock 302. Each of the first metablock 301 and the second metablock 302 includes at least one block from each of the dies 310, 320, 330, and 340 (e.g., the blocks in the metablocks 301 and 302 are distributed across the dies 310, 320, 330, and 340). For example, each of the first metablock 301 and the second metablock 302 includes a block from die 310, a block from die 320, a block from die 330, and a block from die 340. In some embodiments, a metablock may include more than one block from a die. For example, a metablock may include two blocks from a first die, one block from a second die, one block from a third die, and one block from a fourth die.

The first metablock 301 includes the second block from each of the dies 310, 320, 330, and 340. The second metablock 302 includes the ninth block from die 310, the sixth block from die 320, the tenth block from die 330, and the ninth block from die 340. The blocks in each of the first metablock 301 and the second metablock 302 may be selected (by the controller 130 and/or an identification module) using various methods, formulas, equations, functions, operations, algorithms, etc. For example, the controller 130 may identify the first free (e.g., unused) block in each of the dies 310, 320, 330, and 340 as blocks for the first metablock 301 and the second metablock 302.

Figure 4:
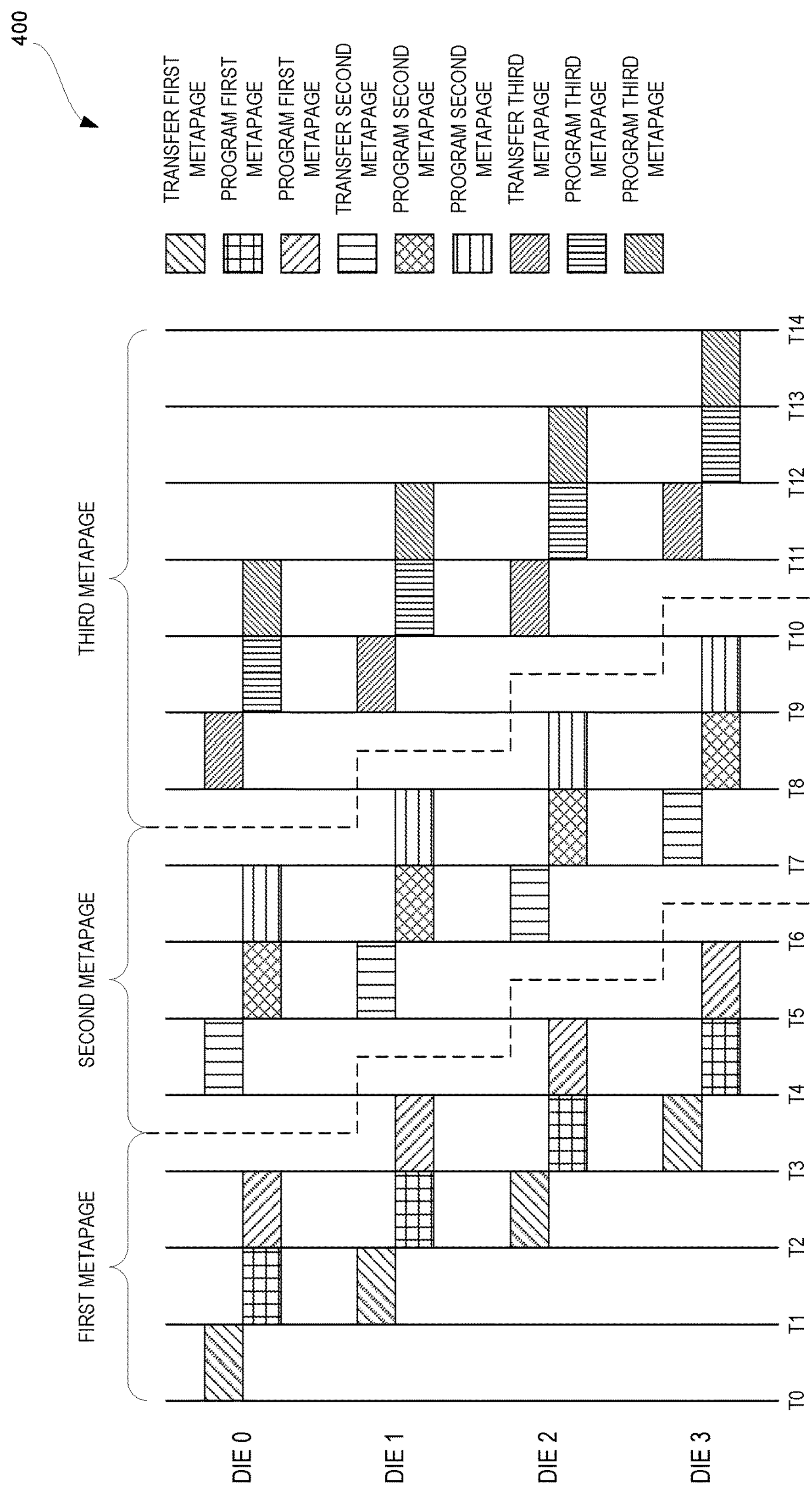
FIG. 4 is a diagram illustrating a timing diagram, according to one or more embodiments of the present disclosure.

FIG. 4 is a diagram illustrating a timing diagram 400, according to one or more embodiments of the present disclosure. The timing diagram 400 may illustrate the operations performed by a data storage device (e.g., data storage device 120 illustrated in FIGS. 1 and 2) when writing data to the data storage device. In one embodiment, the timing diagram illustrates the operations performed by the data storage device during a burst write (e.g., a burst write to SLC memory). As discussed above, dies (e.g., non-volatile memory arrays) in a data storage device may share a channel (e.g., may be on the same channel, may share a common channel, etc.). Die 0, die 1, die 2, die 4 may share a channel to the controller and may include SLC memory. The controller may program (e.g., write) a first metapage, a second metapage, and a third metapage to the die 0 through die 3. Each metapage may include four pages. The first metapage may be programmed to a first metablock and a second metablock, the second metapage may be programmed to a third metablock and a fourth metablock, and the third metapage may be programmed to a fifth metablock and a sixth metablock. Programming a metapage to a metablock may include programming one page (from the metapage) to one block (from the metablock) at a time.

At time T0, the controller may transfer a first page of a first metapage to die 0. At time T1, the controller may transfer the second page of the first metapage to die 1 and may program the first page of the first metapage to a first block (in die 0) of the first metablock. At time T2, the controller may transfer the third page of the first metapage to die 2, may program the first page of the first metapage to a first block of the second metablock (in die 0), and may program the second page of the first metapage to a second block of the first metablock (in die 1). At time T3, the controller may transfer the fourth page of the first metapage to die 3, may program the third page of the first metapage to the third block (in die 2) of the first metablock, and may program the second page of the first metapage to the second block (in die 1) of the second metablock. At time T4, the controller may transfer the first page of the second metapage to die 0, may program the third page of the first metapage to a third block (in die 2) of the second metablock, and may program the fourth page of the first metapage to a fourth block (in die 3) of the first metablock. At time T5, the controller may transfer the second page of the second metapage to die 1, may program the first page of the second metapage to a first block (in die 0) of the third metablock, and may program the fourth page of the first metapage to a fourth block (in die 3) of the second metablock.

At time T6, the controller may transfer the third page of the second metapage to die 2, may program the first page of the second metapage to a first block (in die 0) of the fourth metablock, and may program the second page of the second metapage to a second block (in die 1) of the third metablock. The controller may also determine whether an error occurred when programming the first metablock at time T6. If no error occurred, the controller may erase (e.g., delete, free up, mark as unused) the second metablock. If an error occurred, the controller may erase (e.g., delete, free up, mark as unused) the first metablock. At time T7, the controller may transfer the fourth page of the second metapage to die 3, may program the second page of the second metapage to a second block (in die 1) of the fourth metablock, and may program, the third page of the second metapage to a third block (in die 2) of the third metablock. At time T8, the controller may transfer the first page of the third metapage to die 0, may program the third page of the second metapage to a third block (in die 2) of the fourth metablock), and may program the fourth page of the second metapage to a fourth block (in die 3) of the third metablock. At time T9, the controller may transfer the second page of the third metapage to die 1, may program the first page of the third metapage to a first block (in die 0) of the fifth metablock, and may program the fourth page of the second metapage to the fourth block (in die 3) of the fourth metablock.

At time T10, the controller may transfer the third page of the third metapage to die 2, may program the first page of the third metapage to the first block (in die 0) of the sixth metablock, and may program the second page of the third metapage to a second block (in die 1) of the fifth metablock. The controller may also determine whether an error occurred when programming the third metablock at time T10. If no error occurred, the controller may erase (e.g., delete, free up, mark as unused) the fourth metablock. If an error occurred, the controller may erase (e.g., delete, free up, mark as unused) the third metablock. At time T11, the controller may transfer the fourth page of the third metapage to die 3, may program the second page of the third metapage to a second block (in die 1) of the sixth metablock, and may program the third page of the third metapage to a third block (in die 2) of the fifth metablock. At time T12, the controller may program the third page of the third metapage to a third block (in die 2) of the sixth metablock and may program the fourth page of the third metapage to a fourth block of the fifth metablock. At time T13, the controller may program the fourth page of the third metapage to the fourth block (in die 3) of the sixth metablock. At time T14, the controller may also determine whether an error occurred when programming the fifth metablock. If no error occurred, the controller may erase (e.g., delete, free up, mark as unused) the sixth metablock. If an error occurred, the controller may erase (e.g., delete, free up, mark as unused) the fifth metablock.

Figure 5:
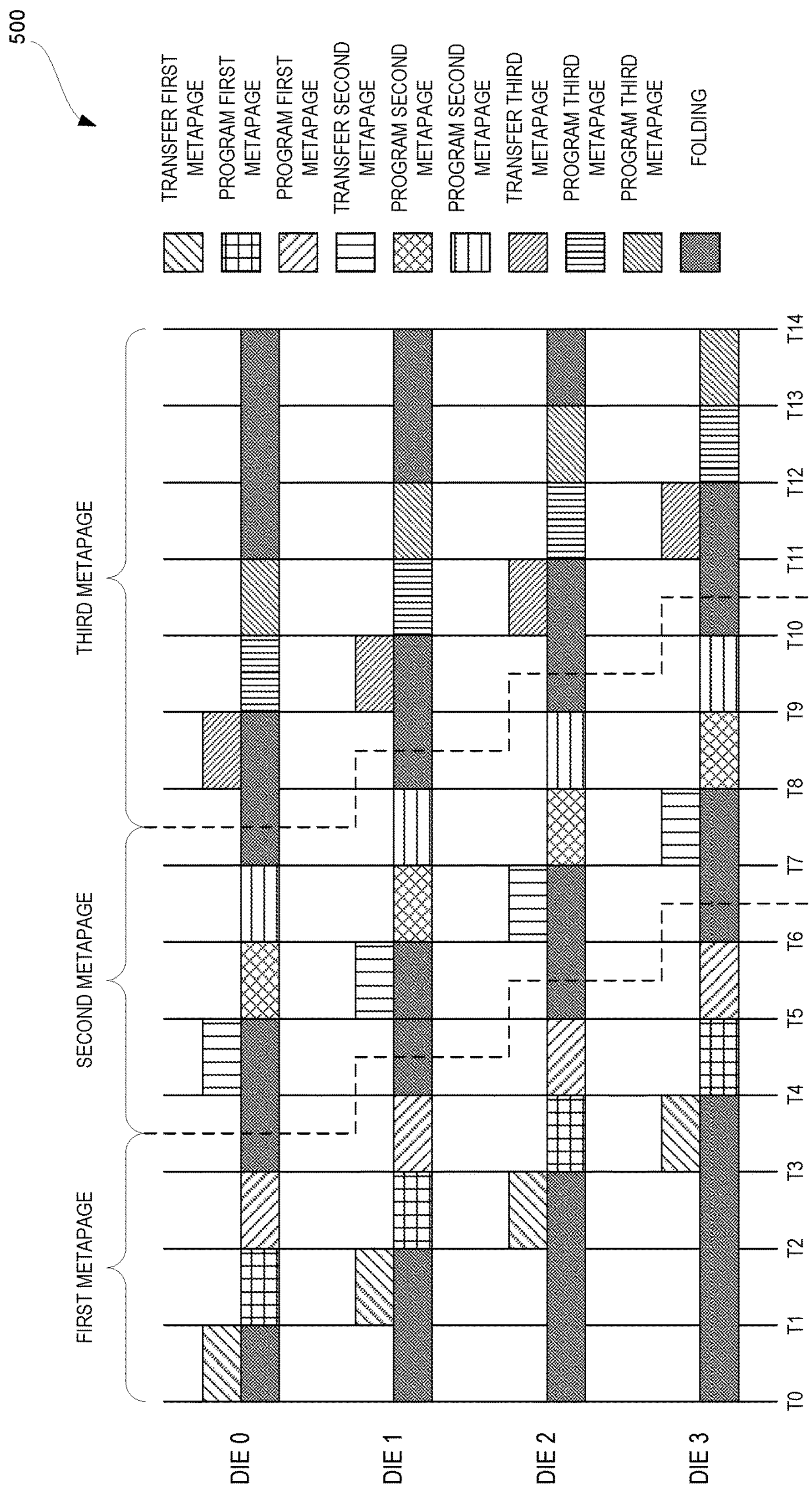
FIG. 5 is a diagram illustrating a timing diagram, according to one or more embodiments of the present disclosure.

FIG. 5 is a diagram illustrating a timing diagram 500, according to one or more embodiments of the present disclosure. The timing diagram 500 may illustrate the operations performed by a data storage device (e.g., data storage device 120 illustrated in FIGS. 1 and 2) when writing data to the data storage device. In one embodiment, the timing diagram illustrates the operations performed by the data storage device during a sustained write (e.g., a sustained write to SLC memory). In one embodiment, the data storage device may perform folding operations (e.g., may move/copy data from dies that include SLC memory to dies that include MLC/TLC memory) to maintain the performance of the data storage device during the sustained write. For example, SLC memory may be faster than MLC/TLC memory (e.g. it may be faster to read and/or write data to SLC memory), as discussed above. Folding operations may allow the data storage device to free up the faster SLC memory (by moving/copying the data to MLC/TLC memory) which may allow the data storage device to maintain higher performance and/or throughput (e.g., write throughput, etc.). As discussed above, the data storage device may perform balanced folding operations (e.g., a folding operation where the amount of data that is copied/moved to MLC/TLC memory is the same as the amount of new data that is written/programmed to the SLC memory).

As discussed above, dies (e.g., non-volatile memory arrays) in a data storage device may share a channel (e.g., may be on the same channel, may share a common channel, etc.). Die 0, die 1, die 2, die 4 may share a channel to the controller and may include SLC memory. The controller may program (e.g., write) a first metapage, a second metapage, and a third metapage to the die 0 through die 3. Each metapage may include four pages. The first metapage may be programmed to a first metablock and a second metablock, the second metapage may be programmed to a third metablock and a fourth metablock, and the third metapage may be programmed to a fifth metablock and a sixth metablock. Programming a metapage to a metablock may include programming one page (from the metapage) to one block (from the metablock) at a time.

At time T0, the controller may transfer a first page of a first metapage to die 0 and may also being folding operations (e.g., folding data from SLC memory to MLC/TLC memory) for die 0, die 1, die 2, and die 3. At time T1, the controller may transfer the second page of the first metapage to die 1 and may program the first page of the first metapage to a first block (in die 0) of the first metablock. The controller may also suspend/pause the folding operations for die 0 at time T1. At time T2, the controller may transfer the third page of the first metapage to die 2, may program the first page of the first metapage to a first block of the second metablock (in die 0), and may program the second page of the first metapage to a second block of the first metablock (in die 1). The controller may also suspend/pause the folding operations for die 1 at time T2. At time T3, the controller may transfer the fourth page of the first metapage to die 3, may program the third page of the first metapage to the third block (in die 2) of the first metablock, and may program the second page of the first metapage to the second block (in die 1) of the second metablock. The controller may also suspend/pause the folding operations for die 2 and may resume/continue folding operations for die 0 at time T3. At time T4, the controller may transfer the first page of the second metapage to die 0, may program the third page of the first metapage to a third block (in die 2) of the second metablock, and may program the fourth page of the first metapage to a fourth block (in die 3) of the first metablock. The controller may also suspend/pause the folding operations for die 3 and may resume/continue folding operations for die 1 at time T4. At time T5, the controller may transfer the second page of the second metapage to die 1, may program the first page of the second metapage to a first block (in die 0) of the third metablock, and may program the fourth page of the first metapage to a fourth block (in die 3) of the second metablock. The controller may also suspend/pause the folding operations for die 0 and may resume/continue folding operations for die 2 at time T5.

At time T6, the controller may transfer the third page of the second metapage to die 2, may program the first page of the second metapage to a first block (in die 0) of the fourth metablock, and may program the second page of the second metapage to a second block (in die 1) of the third metablock. The controller may also determine whether an error occurred when programming the first metablock at time T6. If no error occurred, the controller may erase (e.g., delete, free up, mark as unused) the second metablock. If an error occurred, the controller may erase (e.g., delete, free up, mark as unused) the first metablock. The controller may also suspend/pause the folding operations for die 1 and may resume/continue folding operations for die 3 at time T6. At time T7, the controller may transfer the fourth page of the second metapage to die 3, may program the second page of the second metapage to a second block (in die 1) of the fourth metablock, and may program, the third page of the second metapage to a third block (in die 2) of the third metablock. The controller may also suspend/pause the folding operations for die 2 and may resume/continue folding operations for die 0 at time T7. At time T8, the controller may transfer the first page of the third metapage to die 0, may program the third page of the second metapage to a third block (in die 2) of the fourth metablock), and may program the fourth page of the second metapage to a fourth block (in die 3) of the third metablock. The controller may also suspend/pause the folding operations for die 3 and may resume/continue folding operations for die 1 at time T8. At time T9, the controller may transfer the second page of the third metapage to die 1, may program the first page of the third metapage to a first block (in die 0) of the fifth metablock, and may program the fourth page of the second metapage to the fourth block (in die 3) of the fourth metablock. The controller may also suspend/pause the folding operations for die 0 and may resume/continue folding operations for die 2 at time T9.

At time T10, the controller may transfer the third page of the third metapage to die 2, may program the first page of the third metapage to the first block (in die 0) of the sixth metablock, and may program the second page of the third metapage to a second block (in die 1) of the fifth metablock. The controller may also determine whether an error occurred when programming the third metablock at time T10. If no error occurred, the controller may erase (e.g., delete, free up, mark as unused) the fourth metablock. If an error occurred, the controller may erase (e.g., delete, free up, mark as unused) the third metablock. The controller may also suspend/pause the folding operations for die 1 and may resume/continue folding operations for die 3 at time T10. At time T11, the controller may transfer the fourth page of the third metapage to die 3, may program the second page of the third metapage to a second block (in die 1) of the sixth metablock, and may program the third page of the third metapage to a third block (in die 2) of the fifth metablock. The controller may also suspend/pause the folding operations for die 2 and may resume/continue folding operations for die 0 at time T11. At time T12, the controller may program the third page of the third metapage to a third block (in die 2) of the sixth metablock and may program the fourth page of the third metapage to a fourth block of the fifth metablock. The controller may also resume/continue folding operations for die 1 at time T12. At time T13, the controller may program the fourth page of the third metapage to the fourth block (in die 3) of the sixth metablock. The controller may also resume/continue folding operations for die 2 at time T13. At time T14, the controller may also determine whether an error occurred when programming the fifth metablock. If no error occurred, the controller may erase (e.g., delete, free up, mark as unused) the sixth metablock. If an error occurred, the controller may erase (e.g., delete, free up, mark as unused) the fifth metablock.

Figure 6:
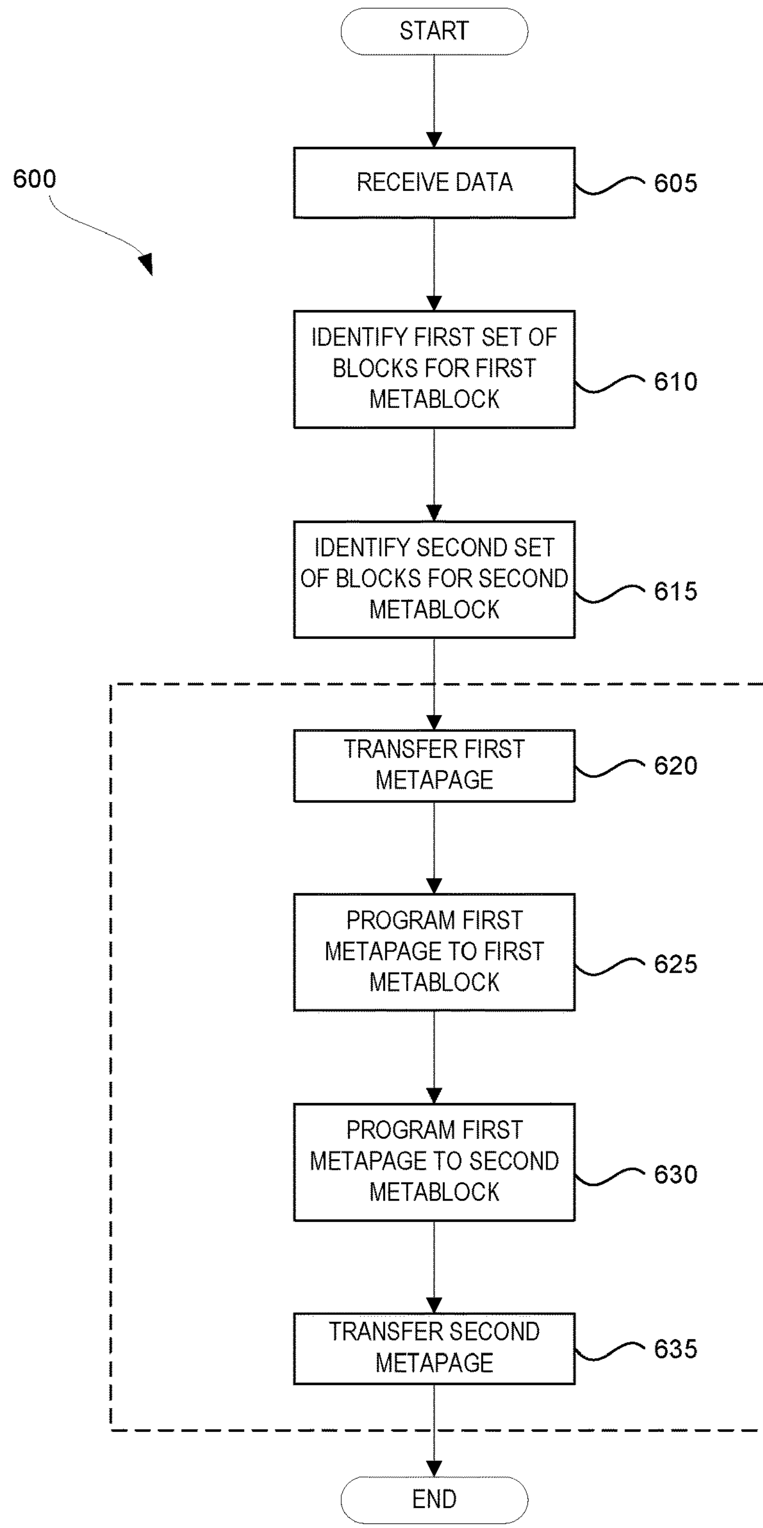
FIG. 6 is a flow diagram illustrating a process for executing access commands on a data storage device, according to one or more embodiments of the present disclosure.

FIG. 6 is a flow diagram illustrating a process 600 for executing access commands on a data storage device, according to one or more embodiments of the present disclosure. The process 600 may be performed by a controller, modules of a controller (e.g., one or more of the command processing module, the transfer module, the programming module, the identification module, the error modules, and the folding module illustrated in FIG. 2), a processing device (e.g., a processor, a central processing unit (CPU), an ASIC, a FPGA, etc.), and/or the data storage device. The controller, modules, processing device, and/or data storage device may be processing logic that includes hardware (e.g., circuitry, dedicated logic, programmable logic, microcode, etc.), software (e.g., instructions run on a processor to perform hardware simulation), firmware, or a combination thereof.

The process 600 begins at block 605 where the process 600 receives data to be programmed (e.g., written) to one or more non-volatile memory arrays (e.g. dies). For example, the process 600 may receive a first metapage of data from a host (e.g., a computing device coupled to the data storage device) via one or more access commands. At block 610, the process 600 may identify a first set of blocks for a first metablock, as discussed above. For example, the process 600 may identify unused blocks in a set of non-volatile memory arrays (e.g., dies) that share a channel (e.g., a communication channel) to the controller. The first metablock may span across the set of non-volatile memory arrays, as discussed above. The first metablock may be for a first copy (e.g., a primary copy) of the metapage, as discussed above. At block 615, the process 600 may identify a second set of blocks for a second metablock, as discussed above. The second metablock may also span across the set of non-volatile memory arrays. The second metablock may be for a second copy (e.g., a secondary/backup copy) of the metapage, as discussed above.

At block 620, the process 600 may transfer the first metapage to set of non-volatile memory arrays. For example, example, the process 600 may transfer the first metapage to a RAM that is coupled to the set of non-volatile memory arrays. As illustrated and discussed above in conjunction with FIGS. 4 and 5, the process 600 may transfer the metapage to each non-volatile memory array in the set of non-volatile memory arrays, one page at a time. At block 625, the process 600 may program the first metapage to a first metablock, as discussed above. As illustrated and discussed above in conjunction with FIGS. 4 and 5, the process 600 may program each page of the first metapage to each block in the first metablock one page/block at a time. At block 630, the process 600 may program the first metapage to a second metablock, as discussed above. As illustrated and discussed above in conjunction with FIGS. 4 and 5, the process 600 may program each page of the first metapage to each block in the second metablock, one page/block at a time. At block 635, the process 600 may transfer a second metapage to set of non-volatile memory arrays. For example, example, the process 600 may transfer the second metapage to a RAM that is coupled to the set of non-volatile memory arrays.

In some embodiments, portions of one or more of the blocks 620, 625, 630, and 635 may be performed simultaneously. For example, referring to FIGS. 4 and 5, portions of the transfer of the second metapage (e.g., the transfer of the first page of the second metapage) may occur simultaneously with portions of the programming the first metapage to the first metablock and the second metablock (e.g., between time T4 and time T5 where the third page of the metapage is programmed to the second metablock and the fourth page of the first metapage is programmed to the first metablock).

In one embodiment, programming a second copy of a page (in a metapage) as soon as the next page (in the metapage) is transferred instead of waiting for an entire metapage to be transferred before programming the second copy of the page may improve the efficiency and/or performance of the data storage device. For example, programming the second copy of the page (in the metapage) as soon as the next page (in the metapage) is transferred may allow the data storage device to perform more operations (e.g., programming a first copy of a first page, programming a second copy of a second page, transferring a third page) simultaneously. This may also allow the data storage device to hide the programming of pages (to blocks in different metablocks) behind transfers of pages to the non-volatile memory arrays (e.g., allows these operations to be performed simultaneously).

In another embodiment, transferring the second metapage to the set of non-volatile memory arrays without waiting for first metapage to be programmed to the first metablock and the second metablock may improve the efficiency and/or performance of the data storage device. For example, instead of waiting for the first metapage to be programmed to the first metablock and the second metablock before transferring a second metapage, the data storage device may transfer the second metapage immediately after the first metapage has been transferred (and while the first metapage is still being programmed to the first metablock and the second metablock). This may allow the data storage device to program metapages to the set of non-volatile memory arrays more quickly because the data storage device may transfer the second metapage more quickly which may increase/improve the performance and/or throughput of the data storage device.

Figure 7:
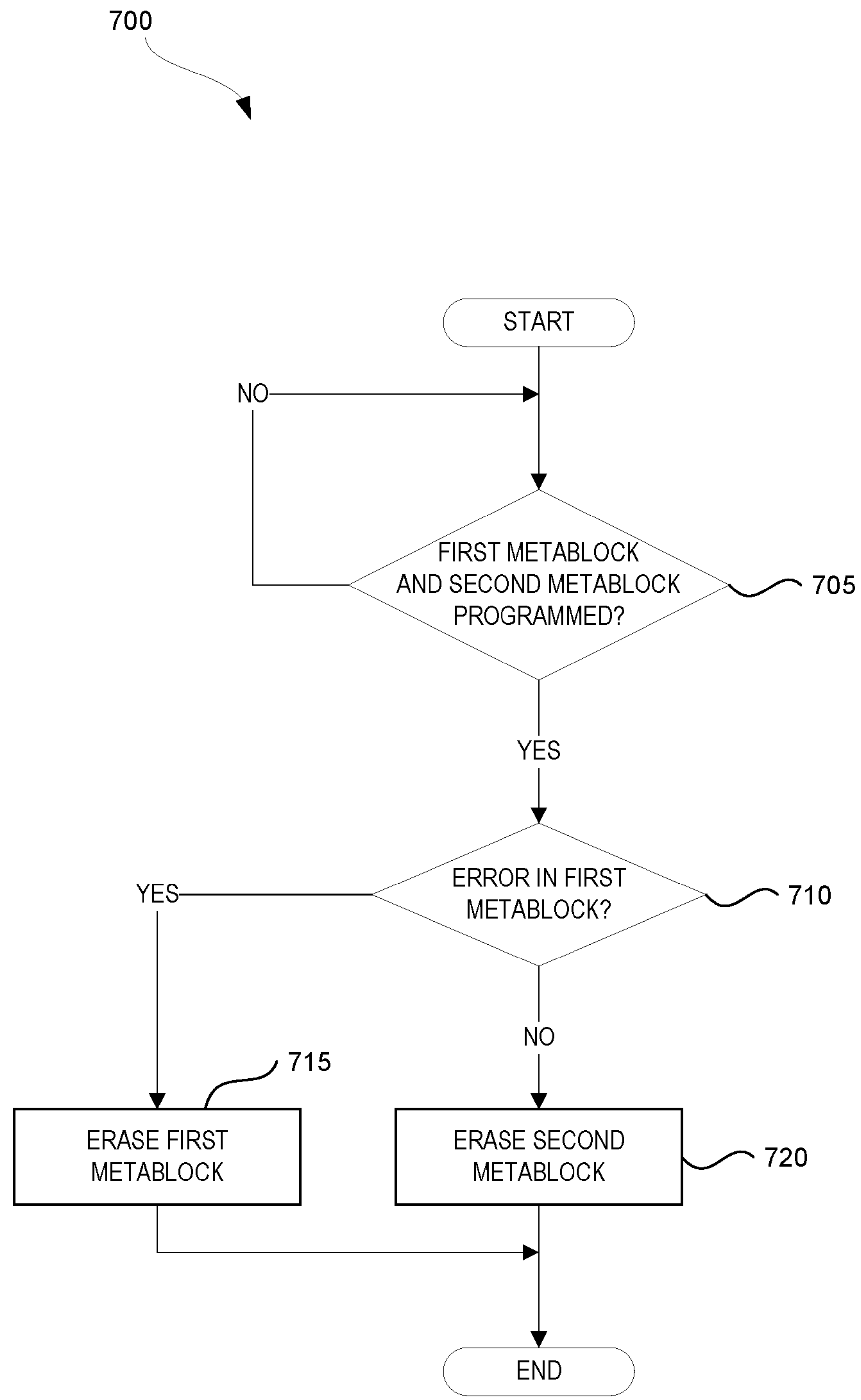
FIG. 7 is a flow diagram illustrating a process for executing access commands on a data storage device, according to one or more embodiments of the present disclosure.

FIG. 7 is a flow diagram illustrating a process 700 for executing access commands on a data storage device, according to one or more embodiments of the present disclosure. The process 700 may be performed by a controller, modules of a controller (e.g., one or more of the command processing module, the transfer module, the programming module, the identification module, the error modules, and the folding module illustrated in FIG. 2), a processing device (e.g., a processor, a central processing unit (CPU), an ASIC, a FPGA, etc.), and/or the data storage device. The controller, modules, processing device, and/or data storage device may be processing logic that includes hardware (e.g., circuitry, dedicated logic, programmable logic, microcode, etc.), software (e.g., instructions run on a processor to perform hardware simulation), firmware, or a combination thereof.

The process 700 begins at block 705 where the process 700 determines whether the first metablock and the second metablock have been programmed. For example, the process 700 may determine whether a metapage of data (received from a host via one or more access commands) has been programmed (e.g., written) to the first metablock and the second metablock of a set of non-volatile memory arrays (e.g., dies) that share a channel to a controller. As discussed above, a first copy (e.g., a primary copy) of the metapage may be programmed to the first metablock and a second copy (e.g., a secondary/backup copy) of the metapage may be programmed to the second metablock.

If the first metablock and the second metablock have not been programmed, the process 700 may proceed back to block 705. If the first metablock and the second metablock have been programmed, the process 700 may proceed to block 710 where the process 700 may determine whether there is an error in the first metablock. For example, the process 700 may determine whether an error occurred while programming the metapage to the first metablock. As discussed above, the process 700 may use various methods, techniques, algorithms, functions, operations, etc., to determine whether there is an error in the first metablock. For example, the process 700 may use a cyclic redundancy check (CRC), an error correction code (ECC), a hashing function (e.g., a cryptographic hashing function), parity data/bits, etc., to determine whether there is an error in the first metablock. If there is an error in the first metablock, the process 700 may erase the first metablock (e.g., may delete the data in the first metablock, may mark/flash the blocks in the first metablock as free/unused, etc.). If there is no error in the first metablock, the process 700 may erase the second metablock (e.g., may delete the data in the second metablock, may mark/flash the blocks in the second metablock as free/unused, etc.).

General Comments

Those skilled in the art will appreciate that in some embodiments, other types of computing devices and/or memories may be implemented while remaining within the scope of the present disclosure. In addition, the actual steps taken in the processes discussed herein may differ from those described or shown in the figures. Depending on the embodiment, certain of the steps described above may be removed, others may be added, and/or reordered.

While certain embodiments have been described, these embodiments have been presented by way of example only, and are not intended to limit the scope of protection. Indeed, the novel methods and systems described herein may be embodied in a variety of other forms. Furthermore, various omissions, substitutions and changes in the form of the methods and systems described herein may be made. The accompanying claims and their equivalents are intended to cover such forms or modifications as would fall within the scope and spirit of the protection. For example, the various components illustrated in the figures may be implemented as software and/or firmware on a processor, ASIC/FPGA, or dedicated hardware. Also, the features and attributes of the specific embodiments disclosed above may be combined in different ways to form additional embodiments, all of which fall within the scope of the present disclosure. Although the present disclosure provides certain preferred embodiments and applications, other embodiments that are apparent to those of ordinary skill in the art, including embodiments which do not provide all of the features and advantages set forth herein, are also within the scope of this disclosure. Accordingly, the scope of the present disclosure is intended to be defined only by reference to the appended claims.

The words "example" or "exemplary" are used herein to mean serving as an example, instance, or illustration. Any aspect or design described herein as "example" or "exemplary" is not necessarily to be construed as preferred or advantageous over other aspects or designs. Rather, use of the words "example" or "exemplary" is intended to present concepts in a concrete fashion. As used in this disclosure, the term "or" is intended to mean an inclusive "or" rather than an exclusive "or". That is, unless specified otherwise, or clear from context, "X includes A or B" is intended to mean any of the natural inclusive permutations. That is, if X includes A; X includes B; or X includes both A and B, then "X includes A or B" is satisfied under any of the foregoing instances. In addition, the articles "a" and "an" as used in this disclosure and the appended claims should generally be construed to mean "one or more" unless specified otherwise or clear from context to be directed to a singular form. Moreover, use of the term "an embodiment" or "one embodiment" or "an implementation" or "one implementation" throughout is not intended to mean the same embodiment or implementation unless described as such. Furthermore, the terms "first," "second," "third," "fourth," etc., as used herein are meant as labels to distinguish among different elements and may not necessarily have an ordinal meaning according to their numerical designation.

All of the processes described above may be embodied in, and fully automated via, software code modules executed by one or more general purpose or special purpose computers or processors. The code modules may be stored on any type of computer-readable medium or other computer storage device or collection of storage devices. Some or all of the methods may alternatively be embodied in specialized computer hardware.

What is claimed is:

1. A data storage device, comprising:

a non-volatile solid-state memory comprising a plurality of dies; and a controller coupled to the plurality of dies via a channel, the controller configured to:

receive first data to be written to the plurality of dies;

transfer a first metapage of the first data to the plurality of dies;

program the first metapage to a first metablock of the plurality of dies;

program the first metapage to a second metablock of the plurality of dies; and transfer a second metapage to the plurality of dies and program the second metapage to a third metablock of the plurality of dies, wherein programming the first metapage to the first metablock is simultaneous with transferring the second metapage to the plurality of dies and wherein programming the first metapage to the second metablock of the plurality of dies is simultaneous with programming the second metapage to the third metablock of the plurality of dies.

2. The data storage device of claim 1, wherein programming a portion of the first metapage to the first metablock is further simultaneous with programming another portion of the first metapage to the second metablock.

3. The data storage device of claim 1, wherein the controller is further configured to:

identify a first set of blocks from the plurality of dies as the first metablock; and identify a second set of blocks from the plurality of dies as the second metablock.

4. The data storage device of claim 3, wherein each of the first set of blocks and the second set of blocks comprises at least one block from each of the plurality of dies.

5. The data storage device of claim 1, wherein the controller is further configured to:

check whether an error occurred when programming the first metapage to the first metablock.

6. The data storage device of claim 5, wherein the controller is further configured to:

erase the second metablock in response to determining that no error occurred when programming the first metapage to the first metablock.

7. The data storage device of claim 5, wherein the controller is further configured to:

erase the first metablock in response to determining that the error occurred when programming the first metapage to the first metablock.

8. The data storage device of claim 1, wherein the plurality of dies comprises single-level cell (SLC) memory.

9. The data storage device of claim 8, further comprising a second plurality of dies, wherein the second plurality of dies comprises multi-level cell (MLC) memory.

10. The data storage device of claim 9, wherein the MLC memory comprise triple-level cell (TLC) memory.

11. The data storage device of claim 9, wherein the controller is further configured to:

move a set of blocks from the SLC memory to the MLC memory.

12. The data storage device of claim 11, wherein moving the set of blocks from the SLC memory to the MLC memory is simultaneous with programming the first metapage to the first metablock.

13. The data storage device of claim 1, wherein the first data is received via a first write command received from a host and wherein the second metapage is from the first data.

14. The data storage device of claim 1, wherein the second metapage is from a second data received via a second write command received from a host.

15. A method comprising:

receiving first data to be written to a plurality of non-volatile memory arrays of a data storage device;

transferring a first metapage of the first data to the plurality of non-volatile memory arrays;

writing the first metapage to a first metablock of the plurality of non-volatile memory arrays;

writing the first metapage to a second metablock of the plurality of non-volatile memory arrays; and transferring a second metapage to the plurality of non-volatile memory arrays and writing the second metapage to a third metablock of the plurality of dies, wherein writing the first metapage to the first metablock is simultaneous with transferring the second metapage to the plurality of non-volatile memory arrays and wherein writing the first metapage to the second metablock of the plurality of dies is simultaneous with writing the second metapage to the third metablock of the plurality of dies.

16. The method of claim 15, wherein writing a portion of the first metapage to the first metablock is further simultaneous with writing another portion of the first metapage to the second metablock.

17. The method of claim 15, further comprising:

identifying a first set of blocks from the plurality of non-volatile memory arrays as the first metablock; and identifying a second set of blocks from the plurality of non-volatile memory arrays as the second metablock.

18. The method of claim 17, wherein each of the first set of blocks and the second set of blocks comprises at least one block from each of the plurality of non-volatile memory arrays.

19. The method of claim 15, further comprising:
checking whether an error occurred when writing the first metapage to the first metablock.

20. The method of claim 19, further comprising:
erasing the second metablock in response to determining that no error occurred when writing the first metapage to the first metablock.

21. The method of claim 19, further comprising:
erasing the first metablock in response to determining that the error occurred when writing the first metapage to the first metablock.

22. The method of claim 15, wherein the plurality of non-volatile memory arrays comprises single-level cell (SLC) memory.

23. The method of claim 22, wherein the data storage device further comprises a second plurality of non-volatile memory arrays and wherein the second plurality of non-volatile memory arrays comprises multi-level cell (MLC) memory.

24. The method of claim 15, further comprising:
moving a set of blocks from the SLC memory to the MLC memory.

25. The method of claim 24, wherein moving the set of blocks from the SLC memory to the MLC memory is simultaneous with programming the first metapage to the first metablock.

26. A data storage apparatus, comprising:
a plurality of dies; and
means for receiving first data to be written to the plurality of dies;
means for transferring a first metapage of the first data to the plurality of dies;
means for programing the first metapage to a first metablock of the plurality of dies;
means for programming the first metapage to a second metablock of the plurality of dies;
means for transferring a second metapage to the plurality of dies;
means for programming the second metapage to a third metablock of the plurality of dies;
means for controlling the means for programming the first metapage to the first metablock and the means for transferring the second metapage to the plurality of dies to program the first metapage to the first metablock and transfer the second metapage to the plurality of dies at the same time; and
means for controlling the means for programming the first metapage to the second metablock of the plurality of dies and the means for programming the second metapage to the third metablock of the plurality of dies to program the first metapage to the second metablock and program the second metapage to the third metablock at the same time.

27. The data storage apparatus of claim 26, further comprising means for controlling the means for programming the first metapage to the first metablock and the means for programming the first metapage to the second metablock to program a portion of the first metapage to the first metablock and program another portion of the first metapage to the second metablock at the same time.

28. The data storage device of claim 26, further comprising:
means for checking whether an error occurred when programming the first metapage to the first metablock;
means for erasing the second metablock in response to determining that no error occurred when programming the first metapage to the first metablock; and
means for erasing the first metablock in response to determining that the error occurred when programming the first metapage to the first metablock.

* * * * *